Sept. 14, 1937.  F. L. O. WADSWORTH  2,093,375
MECHANISM FOR SEVERING MOLTEN GLASS
Original Filed Jan. 23, 1933  3 Sheets-Sheet 1
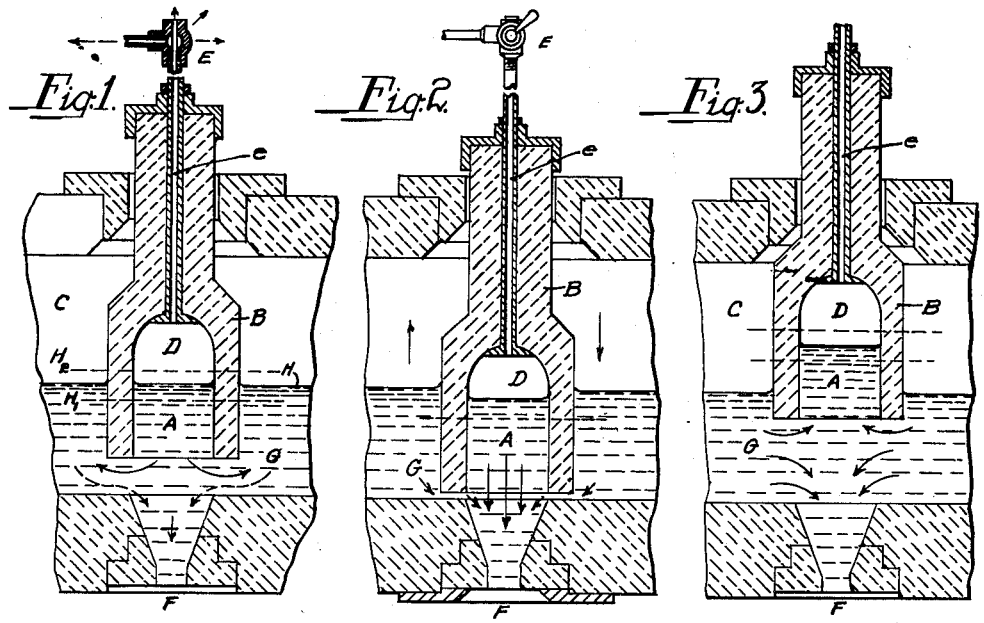
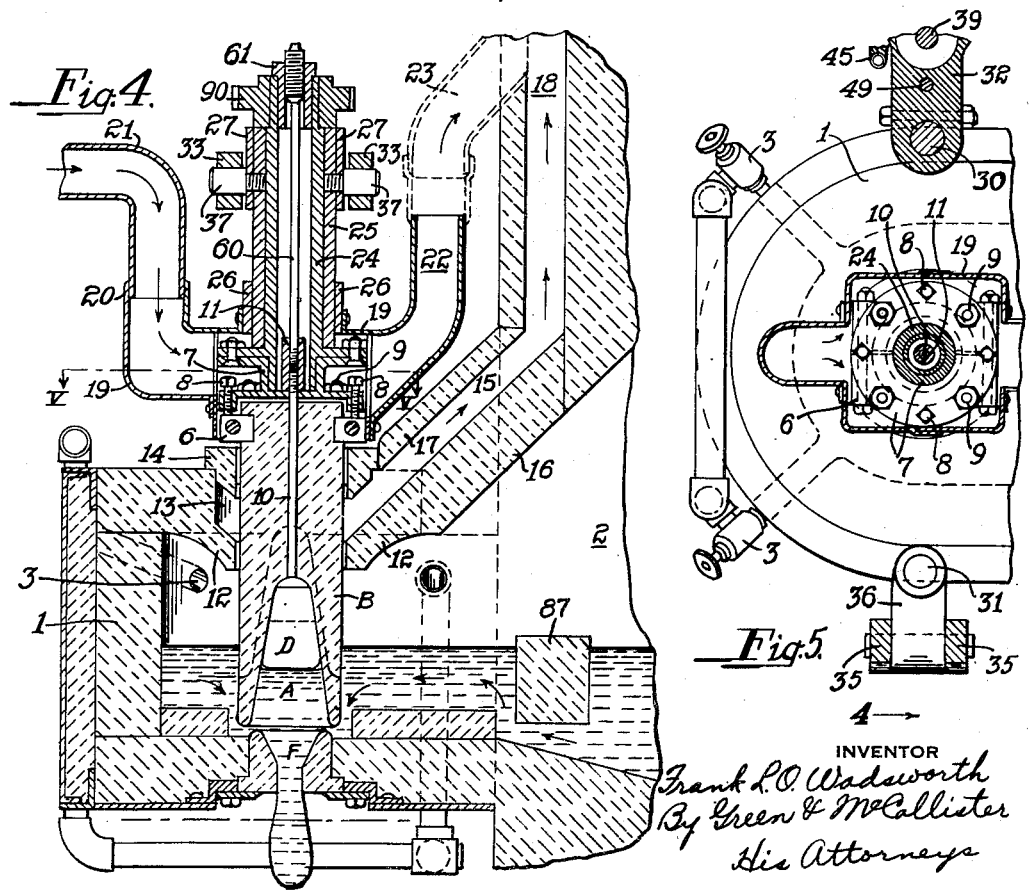
INVENTOR
Frank L. O. Wadsworth
By Green & McCallister
His Attorneys

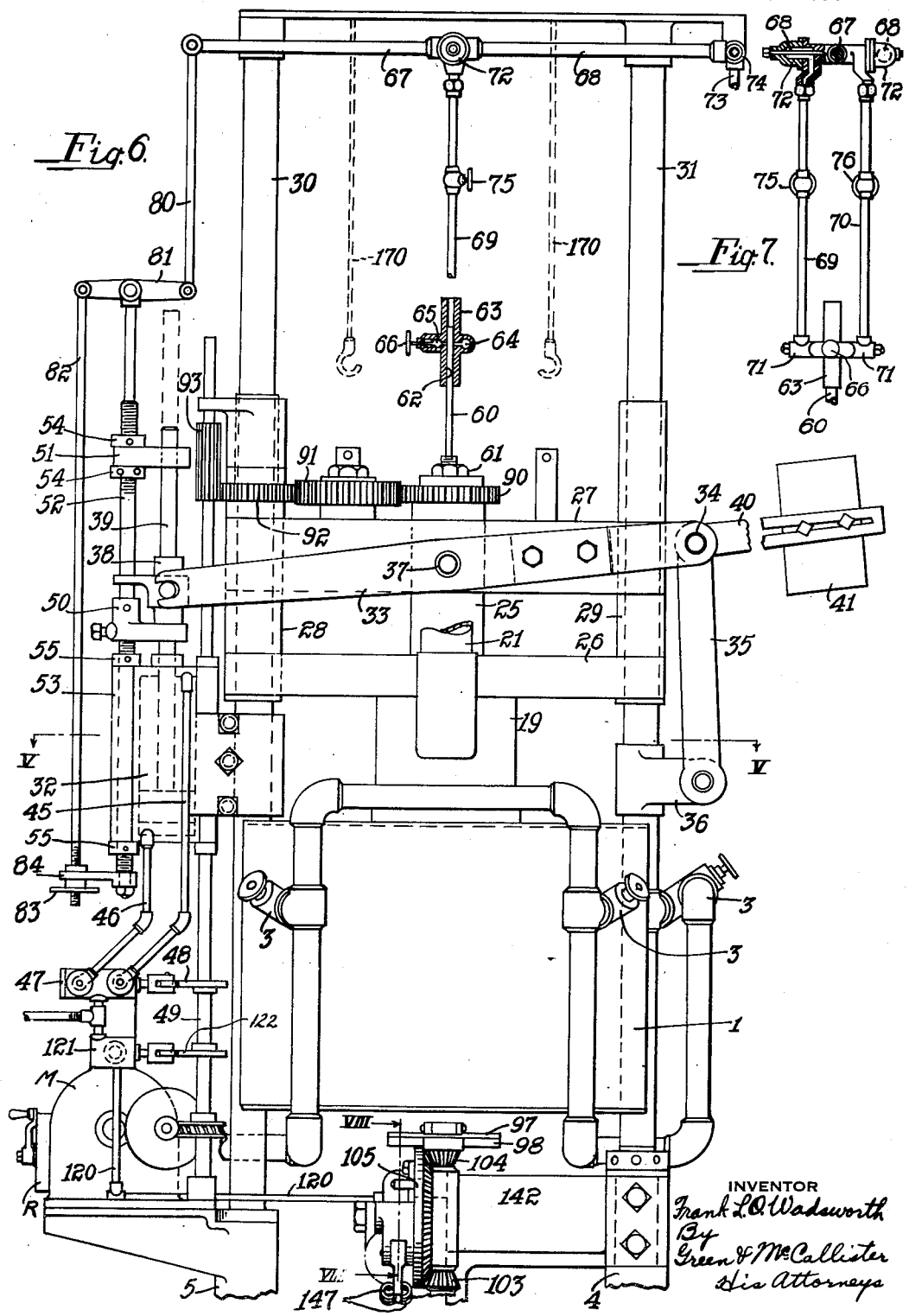

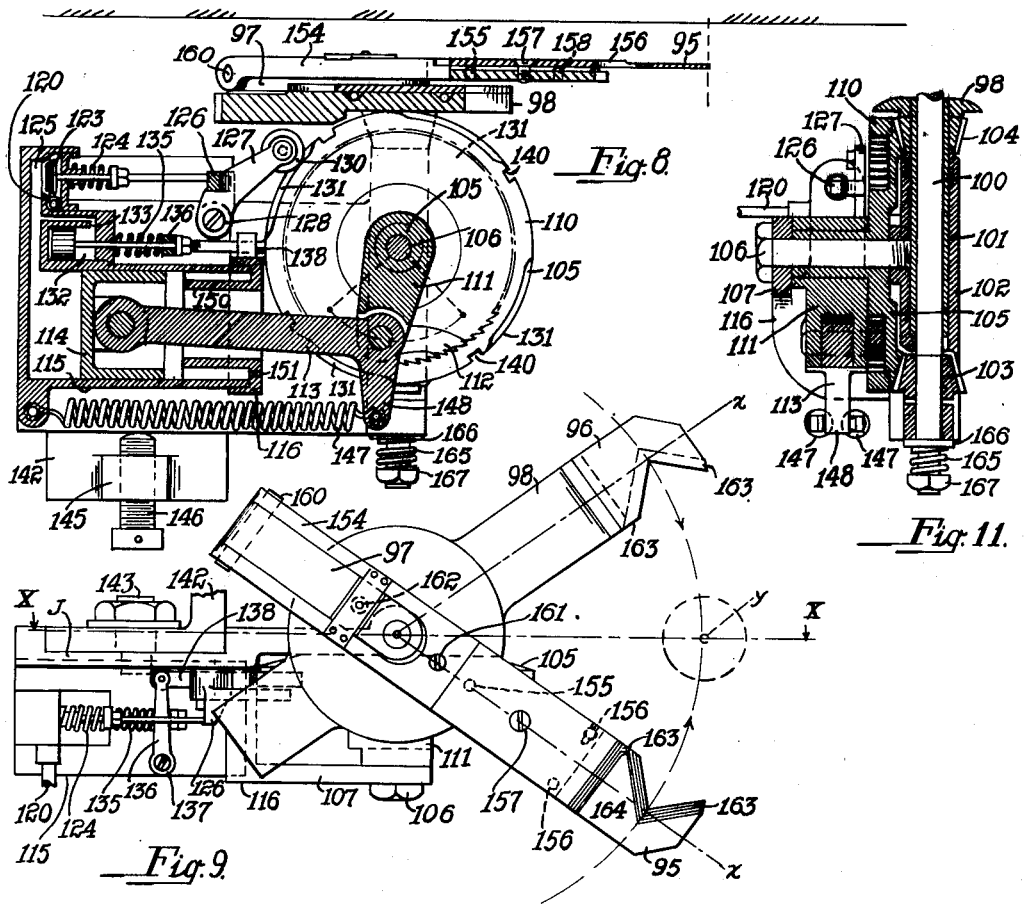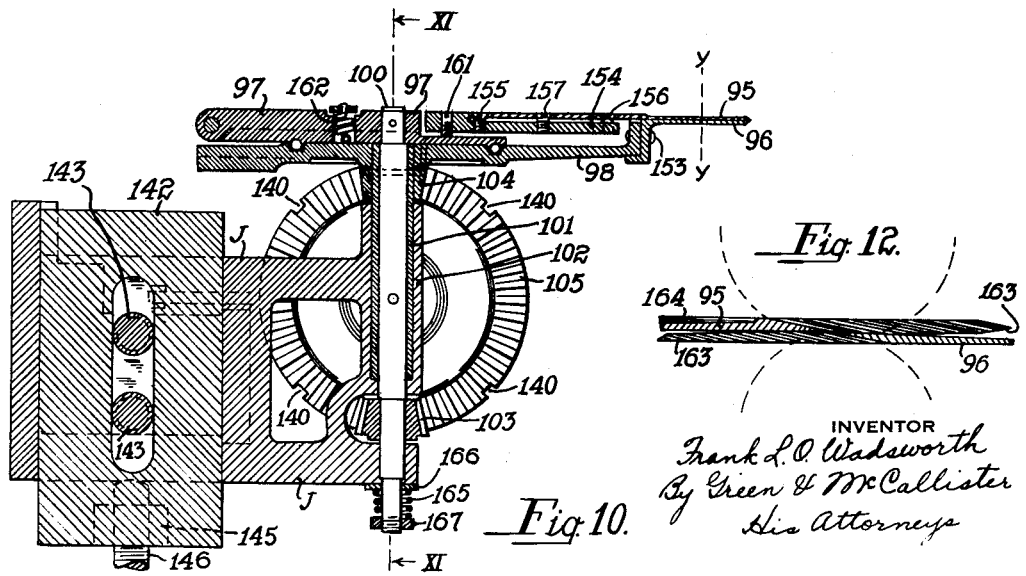

Patented Sept. 14, 1937

2,093,375

UNITED STATES PATENT OFFICE 2,093,375

MECHANISM FOR SEVERING MOLTEN GLASS

Frank L. O. Wadsworth, Pittsburgh, Pa., assignor to Ball Brothers Company, Muncie, Ind., a corporation of Indiana Original application January 23, 1933, Serial No. 653,081. Divided and this application December 9, 1933, Serial No. 701,636. Renewed May 21, 1937

38 Claims. (Cl. 49—14)

This invention relates to improvements in the art of delivering successive charges of molten glass or similar material to the molds or other receptacles in which they are subsequently shaped to final form and more particularly, to improvements in the means for severing successive mold charges from a continuously flowing stream of glass, and is a division of my copending application Serial No. 653,081, filed January 23, 1933.

In general, the main object of this invention is to provide an improvement in a shear mechanism which will operate at such high speeds that it will eliminate the necessity of retarding or arresting the flow from the feeder, whereby the speed of delivery operation may be increased and improve the character of the successively delivered mold charges. Stated more specifically, it is the purpose of the present invention to provide a shear mechanism for cutting successive mold charges from a constantly flowing stream which will operate at such speed that there is no opportunity for the oncoming glass to pile up on the shear blades and unduly heat the same; that will not chill the sheared stub; and that prevents any sensible loss of time in the cutting-off operation and the delivery of each mold charge and the beginning of the formation of the succeeding charge.

These and other objects which will hereinafter be made apparent to those skilled in this particular art are accomplished by means of this invention set forth in the following description of an illustrative embodiment thereof which is depicted in the accompanying drawings, in which:

Figs. I, II, and III are semi-diagrammatic illustrations of the general method of procedure which I follow in the practice of this invention, and of the main parts of the apparatus which I employ in this practice.

Fig. IV is a vertical section, on a central longitudinal plane, of one of the structural embodiments of my improvements; Fig. V is a partial horizontal section, on the plane V—V of Fig. IV of this construction; Fig. VI is a front elevation of this apparatus as viewed at right angles to the sectional plane of Fig. IV; and Fig. VII is a detail side view (partly in section) of a part of the construction shown in Fig. VI.

Fig. VIII is a sectional elevation on the plane VIII—VIII of Fig. VI—of a new form of shearing or severing mechanism which I preferably employ in conjunction with my improved feeder; Fig. IX is a plan view of this mechanism; Fig. X is a sectional elevation on the plane X—X of Fig. IX; Fig. XI is another sectional elevation on the plane XI—XI of Fig. X; and Fig. XII is a greatly enlarged cross section of the shear blades in their closed, or cutting position.

Figs. I, II, and III diagrammatically illustrate the major features of my present improved method, or mode of procedure, for feeding glass from a main source or "parent" body of the molten material; and generally described, this method comprises; the segregation, or partial confinement, of a relatively small portion (A) of glass, in the interior of an inverted cup or bell—such as that indicated by B—which is positioned with its lower open end above a delivery orifice (F) in the floor of the receptacle, or chamber C that contains the parent body of material; and which is capable of vertical reciprocation in a line substantially parallel to the axis of this orifice; the trapping or confining of a fixed or predetermined quantity of elastic fluid (e. g. air) in the space (D) between the upper surface of the segregated mass (A) and the upper end of the cup or bell (B); and the varying of the volume and the pressure of this trapped mass of elastic fluid by the vertical reciprocatory movement of the container, which concurrently varies the area of the opening or passageway G leading from the main receptacle to the segregation chamber in the cup or container (B).

More specifically described the procedure is as follows: At some definite position, or point of movement, of the reciprocable bell, the stop cock E—which is located in a small pipe connection, e, that leads from the upper end of the bell to a suitable source of elastic fluid (either the external atmosphere, or a tank containing compressed or rarefied air)—is momentarily opened and a fixed mass or quantity of this elastic fluid is thus admitted to the space above the glass in the segregation chamber. The cock is then closed, thus trapping this predetermined amount of fluid in the closed upper end of the bell; and the up and down movement of the latter then tends to progressively increase or decrease the volume (and consequently diminish or augment the pressure) of this confined body of fluid and correspondingly raise or lower the level of glass in the segregation chamber.

It will be clearly understood that this action is not dependent upon any mechanical adhesion of the molten material to the surface of the reciprocating container (B)—which is the major factor in the operation of the "sticky plunger feeder"—nor is it due to any alternate admission and withdrawal of air, to and from, the bell cavity—which is the controlling effect in the operation of the ordinary "air feeder"—but is due primarily (and in certain cases solely) to the maintenance of a hydrodynamic equilibrium between the glass outside and inside the moving container. This condition of automatically established equilibrium supplements the action of gravity in determining and controlling the outflow, or rate of discharge, of the molten material through the delivery outlet F; and consequently regulates both the weight and the shape of each charge of glass which is cut off from the outflowing stream by the severing mechanism.

If the cock E is opened to the external air when the bell B is in any definite position or point in its movement—e. g. the positions shown in Fig. I—the glass in the segregation chamber will assume, or tend to assume, the same level (H) as that in the main receptacle. If this cock is turned so as to put the space, D, in communication with a reservoir containing air under pressure, the corresponding level of the glass in the chamber will be depressed (as indicated by the dotted line $H_1$), but if this reservoir contains rarefied air, this level will be raised (as indicated by the dotted line $H_2$). This level (H, $H_1$ or $H_2$) which is established by the momentary opening of the cock E at a predetermined position of the bell—may, for convenience, be termed the starting level or the "neutral" level of the glass in the segregation chamber. In this position glass is flowing from the main body of material, under the lower edge of the bell—through the passage G—and out through the orifice F under the action of gravity alone; and this gravity flow has no effect on the glass in the segregation chamber unless the passageway G is so restricted as to offer a relatively high resistance to the movement of the molten material. But when the cock E is closed and the bell B is moved downward—toward the position shown in Fig. II—the fixed mass of trapped fluid in the chamber D exerts a dynamic pressure on the mass of glass below it, and thereby supplements the effect of gravity in accelerating the outflow from the delivery opening.

The increased pressure on the glass in the downwardly moving cup or bell B, will force a portion of the segregated mass outwardly through the passage G, and back into the parent body of material in the main receptacle C—in opposition to the gravity flow from the said parent body to the outlet F—but this reverse flow will be progressively reduced, and the percentage of pressure induced flow through F progressively augmented, by the continued reduction of the area of the passage G by the downward movement of the container. At the end of the downward movement—when the end of the container is close to the floor of the main receptacle—the flow of glass through the passage G is almost completely arrested and the discharge of glass from the delivery outlet is controlled almost entirely by the pressure in the chamber D.

If molten glass had no viscosity and no inertia—or if the movement of the container is relatively slow—the depression of the level in the downwardly moving bell would (in accordance with the laws of hydrostatic equilibrium) be substantially the same as that downward movement itself. But owing to the fact that glass at its normal working temperature is quite viscous—and therefore offers a substantial resistance to any rapid current movements—and owing to the further fact that glass is much heavier than water; the movement of the material in the segregation chamber will lag behind the movement of the container; and the pressure in the trapped mass of fluid above the glass will, in consequence of this, build up more or less rapidly as the downward movement continues, and will normally reach a maximum at the end of that movement. The flow of glass from the delivery outlet will thus be continually accelerated, during the descent of the member B; and this accelerated flow will continue for a sensible period after the termination of the downward stroke, because of the accumulated pressure in the mass of trapped and compressed fluid (D) in the segregation chamber.

In this respect the results obtained by my improved mode of procedure are different from, and superior to, those obtainable by the use of a reciprocating plunger which throttles, and to that extent retards the discharge of glass from the delivery outlet during the latter portion of the down stroke, and which does not have, and cannot have, any expelling action after the downward movement ends.

When the cup or bell begins to rise it will tend to relieve or reduce the pneumatic pressure on the glass immediately above the orifice, and this will diminish, but will not arrest, the outflow therefrom under the action of gravity. This diminution in the rate of discharge will result in a corresponding contraction, or a natural "necking", of the flowing stream, so that it may then be more readily severed by the cutting mechanism. But this momentary diminution or retardation in the outflow of glass from the segregation chamber (A—D), will be quickly compensated, or corrected, by the rising movement of the bell which increases the area of the passageway G, and thus permits a free flow of glass to the delivery orifice (as well as into the segregation chamber) from the parent body of material in the surrounding chamber C. The resultant increase in the momentarily diminished discharge of material will occur more promptly than in the standard type of "air feeder" (such, for example, as is illustrated in the Hitchcock or McCauley Patents Nos. 805,068 and 1,322,318)—where the ratio between the areas of the discharge orifice and the supply passageway to the segregation chamber remains constant, and where the positive withdrawal of the air from the "air bell" results in the complete arrest, or even a reversal of the delivery flow—; and it will also occur more quickly than in the standard type of "sticky plunger" feeder (e. g. as disclosed in the Brookfield, or Morrison Patents Nos. 836,297 and 810,167) where the upward movement of the plunger may and, as a rule does, result in the arrest and the lifting of the glass between the shearing plane and the outlet orifice.

The operation of my improved feeder is thus broadly distinguished from the action of previous forms of "forced flow" feeders—of either the reciprocating plunger or the fluid impulse type—in which there is a complete arrest or even a reversal of flow at periodic intervals; and a consequent loss of time, and an accompanying decrease in delivery capacity during such intervals.

Referring now to the form of construction shown in Figs. IV, V, VI, and VII; I indicates a forehearth extension or "dog house", which extends out from the front of a glass melting tank 2, and which is provided near its front end with a submerged delivery outlet F; and which is also provided with gas or oil burners 3—3, etc., for maintaining the glass in the forehearth at the desired working temperature.

The reciprocable cup or bell B, which is positioned above the discharge orifice F comprises a refractory cylinder of fire clay or other suitable material, which is provided at its lower end with a frusto-conical segregation or collection chamber A; and which is grooved at its upper end to receive a split champing ring 6, that is adjustably attached and secured to, the flanged collar coupling 7, by the interdigitated set of leveling screws and clamp bolts 8—9, 8—9, etc. The parts B—6 and 7 are further held in their proper concentric or axial association by the tubular bolt 10 whose head engages with the upper wall of the segregation chamber A, and which projects through the lower flange of the coupling 7 to receive an elongated sleeve nut 11 that is screwed down against the said flange after the coupling and ring members 6 and 7 have been adjusted and clamped in their desired relationship.

In order to retard the escape of the heated gases from the forehearth chamber 1 through the opening around the reciprocable bell B— (and thus aid in shielding the ring and coupling connections, 6—7—8—9 etc., from the heating and corrosive effects of these escaping gases) I preferably provide the roof blocks of the dog house with downwardly extending portions 12, which are formed with an enlarged opening 13, of substantially greater diameter than that of the member B; and close the upper end of this opening (13) by means of an annular cover ring or collar 14, which fits closely around the external periphery of this reciprocable member. The annular guard chamber 13 thus formed, communicates, at its rear side (next the tank 2), with an inclined flue 15—which is formed by the channeled roof blocks 16 and the refractory tiles 17— that leads to the vertical stack 18 on the front wall of the glass melting tank 2. In order to further protect the metal supports of the reciprocating bell against any residual escape of gases through the clearance space between the parts, B—14, I may also provide a rectangular sheet metal hood 19, which surrounds the ring and collar assembly, 6—7, etc., and which is connected at one side (by a sliding joint 20) with a stationary supply pipe 21, that leads to one of the usual low pressure air cooling ducts of the forming machine assembly. The current of cooling air which is thus discharged into the guard box 19 escapes therefrom through a vertical vent tube, 22, which may, if desired, be connected, by another sliding joint, with a stationary pipe 23 (see dotted lines) that leads to the flue 18. If this last described arrangement is used the ejector action of the current of discharged cooling air will aid the natural draft of the stack flue 18, in drawing away the hot gases that enter the guard chamber 13 and in preventing their escape past the cover ring 14.

The upper head of the centering coupling 7 is bolted rigidly to the lower flanged end of a hollow shaft 24, that is rotatably mounted in a reciprocable cross head frame, which comprises; the central tubular member 25, the two pairs of transverse bars, 26—26, 27—27, and the two cylindrical side sleeves 28—29, and which are adapted to be moved up and down, on the vertical guide rods 30—31, by any suitable means. In the construction, as here shown, the reciprocatory mechanism comprises an air cylinder 32 which is detachably secured to one of the guide members 30; and a walking beam 33, which is fulcrumed, at 34, on a rocking link member, 35, that is supported, by an adjustable bracket 36, on the guide rod 31. The walking beam is pivotally connected, at its center, with the reciprocable cross head frame, by the removable trunnions 37—37; and is detachably engaged, at its free end, with a collar 38, on the piston rod 39. The walking beam 33 is also preferably provided with an extension arm 40 which carries an adjustable counterweight 41, that serves to partially or completely balance the weight of the cross head frame and of the bell and bell supports carried thereby.

The reciprocation of the above described assembly is effected and controlled by the alternate admission and exhaust of compressed air to and from opposite ends of the cylinder 32, (through the pipe connections 45—46), by the usual form of timer valve mechanism that is actuated by a cam 48 on the motor driven shaft 49. The length of stroke of the cylinder piston—and the upper and lower limits of that stroke—may be varied, and determined, by two adjustable stops, 50 and 51, which are adapted to engage the head 38 on the piston rod 39; and thereby arrest the movement of the reciprocating bell support at any desired and preadjusted points in its travel. These stops are carried by a rod 52, which is slidably mounted in a boss 53 on a cylinder block 32. The upper end of this rod is threaded to receive two lock nuts 54—54 which clamp the upper stop 51 in any desired position on the rod; and the lower end thereof is similarly threaded to receive two other lock nuts 55—55, that serve to secure the rod itself in any desired position in the boss 53. The lower stop 50 is preferably pinned or clamped in a fixed position on the rod; so that the length of stroke can be varied—without changing the lower limit of movement—by adjusting the upper stop alone, or the lower limit of movement may be changed—without altering the length of stroke—by turning the lock nuts 55—55, and thus bodily raising or lowering the rod and stop assembly as a whole. A joint or concurrent adjustment and setting of both pair of lock nuts, 54—54 and 55—55, will regulate both the extreme movement and the uppermost and lowermost positions of the reciprocating bell, within such limits as are imposed by the maximum extent of piston travel.

The upper end of the hollow bolt 10 is connected, by the sleeve nut 11, with the adjacent lower end of a small pipe 60, which passes upward through the hollow shaft 24 and is centered and supported, at the point where it leaves this shaft, by the threaded collar 61. This pipe is closed at its upper end, but is provided with a small side port 62 that is positioned a short distance below the end closure. The upper portion of the pipe 60 is slidably engaged with an open ended sleeve 63 which is of sufficient length to permit this reciprocable member (which performs the functions of the element e of Figs. I, II, and III) to travel through its extreme range of movement without uncovering the port 62. The sleeve 63 is provided with a narrow circumferential groove 64, which opens into a surrounding annular chamber 65, that is formed in the enlarged central portion of the sleeve; and this chamber communicates with the external air through a lateral port opening that can be opened or closed by the manually operable valve 66. The sleeve is suspended from an overhead frame, 67—68—68, by means of the two tubular (pipe) links, 69—70, which serve to support and hold the sleeve in a definite preadjusted position with respect to the reciprocating pipe member 60, and thus periodically establish a momentary connection (through the groove 64 and the port 62) between the sleeve chamber 65 and the interior of the moving bell. The ducts or passages in the hollow suspension links 69—70 are connected, at their lower ends, with the sleeve chamber 65, by means of the elbow couplings, 71—71; and are also connected, at their upper ends, with the hollow (pipe) arms 68—68, by means of the elbow joints 72—72. The opposite extremities of the arms 68—68 are, in turn, coupled to the fixed ends of two independent fluid supply conduits 73 (one of which appears in Fig. VI) by a second pair of elbow joints (74—74) which are similar to those (72—72) shown in Fig. VII which also serve as a pivotal support, or fulcrum, for the frame assembly 67—68 etc. The tubular links 69 and 70 are provided with manually controllable valves, 75—76, which serve to open or close the passageways therethrough, and thus establish or shut off communication between the sleeve chamber 65 and the fluid supply conduits 73—73, one of which leads to a source of fluid under superatmospheric pressure, and the other of which is connected to a source of fluid under sub-atmospheric pressure (vacuum). The opening of any one of the three valves, 66, 75 or 76 (the other two being closed) permits of the periodic equalization of the pressure in the bell chamber (A—D) with that of the external atmosphere, or with the fixed pressure in either of the fluid supply conduits 73; this periodic equalization being automatically effected whenever the port 62 in the pipe 60 is brought into registry with the groove 64 in the sleeve 63.

In order to vary the point in the bell movement at which the equalization last referred to is brought about—either at the beginning of the operation, or periodically during each up and down stroke of the reciprocating members—the frame 67—68 may be rocked up and down, on its fulcrum support (at 74), by means of a link and lever connection 80—81—82, and the hand wheel 83, which is rotatably supported on a bracket 84 extending from the lower end of the rod member 52 and which is threaded to engage the adjacent end of the link 82. This system of connections permits of the independent adjustment of the sleeve member (62) with respect to the reciprocable members (B—60 etc.)—so as to establish a desired pressure, (and trap a predetermined quantity or mass of elastic fluid) in the bell chamber (D) at any predetermined point in the up and down movement of the latter—or of a conjoint adjustment of the sleeve member and the bell members, such as may result from the resetting of the lock nuts 55—56, and the consequent variation and regulation of the lower limit of bell movement.

It is a further purpose of my present improvements to establish and maintain substantial uniformity of temperature in the outflowing stream of molten glass. In order to accomplish this object I preferably use a forehearth which is relatively short (i. e. which extends only a small distance from the front wall of the main tank), and which is provided (as shown in Fig. IV) with an upwardly inclined roof portion 16 that permits me to secure a large unobstructed opening between the forehearth chamber and the large main tank chamber, in which the temperature conditions are less subject to sudden fluctuations—and are less affected by outside influences—than is the case in a relatively small, and more or less isolated, extension thereof. The flow of glass from the main tank to the forehearth is, in this case, controlled or throttled by a floating "skimmer" block 87, which is normally held away from the threshold of the forehearth floor, by any suitable means, but which can, when occasion arises, be allowed to move up against this threshold and thus shut off entirely the further flow of glass thereover.

The up and down movement of the bell B serves to agitate and "stir" the mass of molten glass in which it is immersed, and thus aids in maintaining uniformity in temperature conditions therein. This effect may be supplemented, if desired, by also imparting a rotary movement to the reciprocating member B. This is accomplished by providing the upper end of the supporting shaft 24 with a spur gear, 90, which is operatively connected with an elongated spur pinion 93, on the motor shaft 49, by means of the two idle gears 91, 92 that are rotatably mounted on, and carried by the cross head frame members, 27—27—28 etc.

One of the features of operation which is characteristic of my improved feeder is the elimination of any intervals of completely arrested flow—or of any lifting of the glass with respect to the severing means—and this makes it desirable to provide a shear mechanism (for cutting off successive mold charges from the constantly flowing stream) that will operate with such speed that there is no opportunity for the oncoming glass to "pile up" on the shear blades and unduly heat the latter.

One form of shear mechanism which I have designed for use in connection with my new feeder (as another part of my present improvements) is shown in part in Fig. VI, and is illustrated in detail in Figs. VIII, IX, X, XI, and XII. In this construction the two shear blades 95 and 96 are adjustably and detachably mounted on two arms or heads 97—98, that are respectively secured to, and revolve with, a vertical shaft 100 and a concentric tubular sleeve 101, both of which are rotatably supported in the long bearing member 102. A bevel pinion 103 is keyed, or otherwise suitably attached to the lower end of the shaft 100, and a second bevel pinion 104 of the same pitch diameter is secured to the upper end of the sleeve 101, and to the adjacent portion of the head 98 carried thereby; and both of these pinions are engaged by an intermediate bevel gear 105, which is revolvably mounted on a fixed horizontal stud shaft 106, that is supported, at one end, by the bearing member 102, and at the other by another portion 107 of the bearing frame (J). The peripheral edge of this gear (105) is provided with an annular collar 110, that is detachably secured thereto in any suitable manner; and the hub of the said gear forms a bearing shaft for a short crank arm 111, which carries a multiple toothed pawl 112, that is adapted to engage with the inner toothed face of the collar 110. The forked end of the crank member 111 is connected, by the link 113, with the reciprocable piston member 114 of a fluid pressure cylinder 115, which is mounted at one side of the frame support (J), and which is engaged at its open end by an annular U-shaped head 116, that may form an integral part of the said support.

The closed end of the cylinder 115 is connected, by the conduit 120, with a suitable source of compressed fluid, which is admitted to, and exhausted from, the piston chamber by the action of a timer valve mechanism 121, that is actuated by a cam 122 on the motor shaft 49 (see Fig. VI), in proper synchronism with the previously described timer device 47—48. A disc valve 123, which is normally held open by a spring 124, is interposed between the end of the conduit 120 and the port opening 125, at the rear of the piston 114; and the stem of this valve is engaged by a lug 126 on a lever 127 that is pivotally supported (at 128) on the frame J. The free end of this lever 127 carries a cam wheel 130, which engages with a four lobe cam surface (131—131 etc.) on the edge of the collar 110. The valve box extension, which contains the valve element 123 and the port passage 125, is further provided with a small auxiliary piston chamber 132, which is connected at its front end with the passage 125 by a branch port 133; and the stem of the enclosed piston, which is held in its advanced position by the spring 135, is engaged by an intermediate slotted portion of a lever, 136, that is pivotally mounted, at 137, on the main cylinder 115. The other extremity of this lever is flexibly connected to a bar pawl 138, that is slidably mounted in a lug on the cylinder head 116, and is adapted to engage with rectangular recesses 140—140 etc. on the rim of the connected collar and gear elements 105—110.

The above described assembly is supported, as a unit, on a heavy angularly adjustable arm 142 which can be rigidly clamped, in any desired position, on one of the posts (4) that carry the forehearth frame and the vertical guide 31 (see Fig. VI); and in order to provide for a vertical setting of the shears, with respect to the delivery orifice F, the end of this arm is slotted to receive the stud bolts 143—143 that serve to clamp the cylinder block 115 to the shear frame J, and to also clamp the said frame to the arm support 142. This arm is preferably so adjusted, on the post 4, that the vertices, or central points, of the notched shear blades 95—96 will meet and cross on the axis, y, of the flowing stream of glass; but this adjustment may be readily varied to shift this point of intersection to one side, or the other, of the said axis. In order to facilitate the up and down movement of the shear mechanism—toward and from the flow opening F—the arm 142 may be provided with a threaded lug 145, which carries a capstan headed screw 146 that engages with the lower edge of the frame J.

The operation of my improved shear mechanism is as follows: During the formation of each mold charge—in the manner previously described—the rear end of the cylinder 115 is opened to the atmosphere (by the action of the timer valve mechanism 121—122), and the piston 114 is then drawn back against this end, by the pull of the two tension springs 147—147 which are attached to the lateral extension 148 of the connecting arm 113. The initial adjustment of the parts is such that, at this time, the axes ox—ox of the two shear blade arms are preferably positioned in the same vertical plane, and the shear blades are held at a point 180 degrees from the axis, y, of the flowing stream of glass. The gears 103, 104, and 105 are so engaged that, in this position of the shear blades, one of the notches 140, on the periphery of the collar 110, is in registry with, and is engaged by the end of the pawl bar 138; and the engaged parts are thus locked against movement. At this time of locked engagement the cam wheel 130 is riding in one end of a depressed portion of a cam groove 131; and the check valve 123 is held open by the spring 124.

When it is desired to sever the completed mold charge the actuating fluid is admitted to the rear end of the main cylinder 115, and to the front end of the auxiliary cylinder 132 (by the action of the timer valve mechanism 121—122), and acts, first, to withdraw the pawl 138 from the notch 140 with which it is then engaged; and next to advance the connected piston and crank arm members (114—113—111). This advance movement engages the pawl 112 with the toothed collar 110, rotates the gear 105, in a counterclockwise direction (as viewed in Fig. VIII), and correspondingly revolves the shear arms and shear blades in opposite directions about the axis, o, of the concentric shaft and sleeve elements 100—101. This rotary movement of the cutting elements causes the oppositely rotating shear blades to meet and cross each other on, or near, the axis of the flowing stream, and to sever the latter at the time when the blades are traveling at a maximum speed; and the continued movement of the said blades carries them away from the hot stub of molten material before they can exert any sensible chilling effect thereon, and before they can themselves be unduly heated thereby.

The gears 103—104, and 105 are so proportioned (as here shown the ratio of pitch diameters is 1:4) that each forward stroke of the piston 114 revolves the shear arms through one complete revolution and brings another notch 140 in registry with the stop pawl 138. But in order to slow down the last half of the rotary movement—and thus gradually and quietly absorb the kinetic energy of the moving parts—I provide means for cutting off any further admission of the actuating fluid to the cylinder 115, after the shear blades have met and severed the stream of glass, and completing the forward stroke by the expansion of the fluid then remaining in the piston chamber. This is effected by the disc valve and cam wheel assembly 123—124—126—130. Immediately after passing the "half way" point in the movement of the gear 105, the cam wheel 130 is engaged by one of the raised lobe portions on the collar 110; and the disc valve 123 is thereby closed, and held closed until just before the completion of the forward stroke. In order to still further damp and retard the last half of the operative movement the cylinder head 116 is provided with an inturned annular flange 150 which closely embraces the skirt of the piston 114; and when these parts engage each other, a mass of air is trapped and progressively compressed between the edge of the advancing skirt and the closed end of the annular head 116; the degree of this compression being regulatable by varying the size of the small vent opening 151. The forward stroke of the piston—and particularly the last half of that stroke—is also resisted by the progressive expansion of the return springs 147—147; and by properly proportioning the strength of these springs, the thickness of the piston skirt, and the size of the throttling vent 151, with respect to the area of the main piston 114 and the initial fluid pressure acting thereon, the moving parts may be brought to rest without shock or jar by the action of the stop pawl 138, which has at that time been allowed to return to its engaging position by reason of the expansion and drop in pressure in the piston chambers.

The disc check valve 123 is held closed—even after the wheel 130 has run off from the raised lobe of the cam ring collar 110—by the superior pressure in the conduit line 120, until the timer valve 121 shuts off this pressure, and opens the conduit to the atmosphere; after which the said valve opens automatically and permits any residual air in the main piston chamber to escape and the piston 114 to be returned to its initial position by the springs 147. In this return movement the one way pawl 112 runs back over the ratchet teeth of the locked gear elements 105—110, which remain at rest until the timer valve mechanism 121 is again operated to actuate the shear blade assembly, and sever another mold charge from the glass stream.

The rapidity of action which is attainable with the above described mechanism is far greater than that which can be secured with any form of reciprocating single blade shear, or two blade "scissor" shears. If, as here shown, the radius of action—i. e. the distance of the axis of rotation (o), to the axis of the flowing stream (y)—is 7 inches; and if the angular speed of movement of each blade, at the time of cutting, is 600 R. P. M. (10 R. P. S.); then the time required to sever a stream 2" in diameter is only slightly greater than 0.002 second; and the total time during which any part of either shear blade remains in contact with the glass is less than 0.005 second. These times are less than 1/15 to 1/50 of the periods required for the performance of these same operations with the shear mechanisms now in use; and they can be still further reduced, if desired, by the use of a larger actuating piston (114), or a higher actuating pressure. The advantages of this "superspeed" type of cutting mechanism are therefore very marked; both in the elimination of any chilling or blurring of the molten glass at the plane of severance (shear marks), and in the avoidance of any sensible heating of the shear blades themselves, and the consequent lengthening of their effective life.

In order to secure the most efficient cutting action for long continued periods of use—and in order to provide for the quick replacement of either or both of the cutting elements when they have been accidentally injured or have become dull—I prefer to mount the shear blades (95 and 96) on the arms, 97 and 98, in the manner illustrated in detail in Figs. IX and X. As there shown, the lower shear blade 96 is formed of a thin narrow plate of steel (preferably a nickel chromium, or a chrome manganese alloy), which is of L-shaped contour, and which is rigidly secured, in fixed position, to the upturned end of the arms 98 by means of dowel pins and screws (153). The upper shear blade 95 is a straight flat plate of similar material, and is supported on the outer end of the U-shaped arm 154 by three vertically adjustable stud pins, 155—156—156, two of which (156—156) engage respectively with a conical recess and a transverse groove in the lower face of the shear blade 95, and the third of which (155) bears against the flat surface thereof. The blade is held down on these pins by a single centrally disposed clamp screw 157, and is thereby restrained against movement in any direction with respect to the member 154; but the forked end of this member is pivotally connected to the head 97 (at 160) and is movable up and down with respect thereto. The range of downward movement is limited by the adjustable stop screw 161 which is threaded through the arm 154, and is normally held in engagement with the head 97 by the tension spring 162.

The various parts of this shear blade assembly are so adjusted that when the blades meet and cross each other, the upper blade will "ride up" on the lower one (this being permitted by the pivotal connection between the two rigid members 154 and 97); and will be held in yielding spring contact therewith by the spring 162. To facilitate this crossing movement the advancing corner portions, 163—163, of each shear blade are beveled (as best shown in the enlarged cross sectional view of Fig. XII); and the upper face of the lower shear blade 96 is crowned slightly (as shown in an exaggerated scale in Fig. XII). The upper face of the other shear blade 95 is also recessed, or cut away, on those portions back of the cutting edge (as at 164) in order to prevent a wiping contact of this portion with the end of the severed stub of glass.

The enlarged central portions of the shear blade supports, 97 and 98, are held in elastic pressure contact with each other—or more properly stated with the rolling elements of an interposed ball bearing—by means of an adjustable spring 165, which is interposed between a thrust collar 166 and a lock nut 167 on the lower end of the central shaft 100; and this spring also serves to keep the rotating sleeve 102 and the attached pinion 104 seated tightly against their end bearings in and on the supporting frame member 102. All of the rotating parts which carry the shear blades are thus held against any relative vertical displacement—except such as is intentionally provided by the pivot connection between the members 97 and 154—and a clean uniform cutting action, which is not affected by the wear between the contacting faces of the shear blades, is thus assured.

The reciprocable bell member B may be readily lifted out of the forehearth by disconnecting the air line and stack flue connections 21 and 23, uncoupling the union joints in the pipe lines 69 and 70, and removing the pintle pin 34; and then raising the entire cross head assembly 24—25—26—27 etc., by means of two cables 170—170 that are attached to a suitable hoisting mechanism (not here shown). The upward movement of the cross head carriage will automatically disengage the forked end of the walking beam 33 from the piston rod head 36; and the removal and replacement of the suspended bell (B) may be effected without disturbing any of the various adjustments which have been previously described.

The shaft 49 which actuates the timer valve mechanisms, 47—48, 121—122, and also serves to rotate the bell member B—is driven, through suitable reduction gearing, by a variable speed motor M, that is controlled by a manually operable rheostat R. If the feeder is to be used with a forming press (or press and blow) machine of the usual character, the latter should be operated in synchronism with the formation and severance of successive mold charges; and this may be done either by a mechanical connection between the shaft 49 and the operating mechanism of the forming machine, or by the provision of an additional timer valve device (similar to that indicated at 47) for pneumatically actuating the said mechanism. The construction of these timer valve devices, and the manner in which they may be used for the purposes indicated, are so well known to those skilled in this art that no description of them is necessary.

Various other details of construction, which are illustrated in the drawings, but which may not have been specifically referred to or described, will be readily understood, and if necessary elaborated, by glass house engineers; and with the above disclosures as a guide, those familiar with other types of glass feeder apparatus can readily design alternative and equivalent forms of construction which will operate in accordance with principles hereinbefore explained, and which will embody, in whole or in part, as may be desired, the features of my present improvements. The accompanying drawings illustrate only one of various structural assemblies which I have designed for the purpose of practicing my invention and the feeder therein disclosed forms the subject matter of and is claimed in the aforesaid application Serial No. 653,081; and the invention itself is therefore to be limited only as indicated by the language and the scope of the appended claims.

I desire it to be understood that I have devised various shearing structures, and various shearing procedures for severing a continuously flowing stream of molten glass to produce well formed mold charges and that such mechanisms and procedures form the subject matter of and are claimed in copending applications for Patents Serial Numbers 701,635 filed December 9, 1933; 702,346 filed December 14, 1933; 709,597 filed February 3, 1934; and 718,359 filed March 31, 1934, and all of which structurally and functionally distinguish from the features herein claimed.

What I claim as new and desire to secure by Letters Patent is:

1. A shear mechanism for severing measured charges of molten glass from an issuing stream, comprising opposed shear blades, mounted to revolve about a common axis, means for moving said blades in opposite directions through approximately a complete revolution so that their cutting edges pass each other within the confines of such stream, means for bringing said blades to rest at the end of a complete revolution, and means for holding such blades stationary at a point remote from said stream.

2. A shear mechanism for severing measured charges of molten glass from a mass of molten glass suspended from a glass submerged orifice, comprising opposed shear blades, blade carrying arms each mounted to revolve about an axis, means for releasably locking said arms in a fixed position with said blades remote from such orifice, and means consisting of a motor mechanism, for periodically revolving said arms in opposite directions and for accelerating the motion of said blades while moving toward the axis of said flow orifice and then decelerating such motion and bringing said blades to rest at a point remote from said flow orifice.

3. A shear mechanism for severing charges of molten glass from a suspended mass of such glass, comprising opposed shear blades, each mounted for rotation about an established axis and through the axis of said mass, means for locking said blades in a position remote from such mass, means for disengaging said locking means, and means for rotating each blade through a complete revolution back to such position of rest.

4. A shear mechanism for severing charges of molten glass from a mass of such glass, comprising opposed shear blades, each mounted for rotation about a common axis, means for holding said blades in a fixed position remote from said mass, means for disengaging said holding means, means for rotating each such blade from such fixed position and back to such fixed position, while such holding means is disengaged, and means for adjusting the vertical position of such blades with relation to such mass.

5. A shear mechanism for severing charges of molten glass from a suspended mass of such glass, comprising opposed shear blades, each mounted for rotation about an established axis, means for locking said blades in a position remote from such mass, pressure responsive means for disengaging said locking means, pressure responsive means for rotating each blade through a complete revolution back to such remote position, and means operable during such rotation of said blades for occasioning a drop in the actuating pressure delivered to said second named pressure responsive means.

6. A shear mechanism for severing charges of molten glass from a mass of such glass comprising opposed shear blades each rotatably mounted on a common axis, means for locking said blades against rotation, means for disengaging and holding said locking means in inoperative position, means for periodically rotating said blades through one complete revolution, and means for releasing said locking means during the rotation of said blades.

7. A shear mechanism for severing charges of molten glass from a suspended mass of such glass comprising opposed shear blades each mounted for rotation about a common axis, means for locking said blades in a fixed position remote from said mass, a motor for disengaging and holding said locking means in inoperative position, a motor for rotating said blades through one complete revolution, and means for periodically operating said motors to disengage said locking means and rotate said blades through one revolution.

8. A shear mechanism for severing charges of molten glass from a suspended mass of such glass comprising opposed shear blades each mounted for rotation about a common axis, means for locking said blades in fixed position remote from said mass, a motor for disengaging and holding said locking means in inoperative position, a motor for rotating said blades through one complete revolution, means for periodically operating said motors to disengage said locking means and rotate said blades, and means operable as said blades are moving for reversing the motor of said blade-locking means.

9. A shear mechanism for severing charges of molten glass from a suspended mass comprising opposed shear blades each mounted for rotation about a common axis, means for locking said blades in a position remote from said mass, pressure responsive means for disengaging said locking means, pressure responsive means for rotating said blades through a complete revolution, a pressure inlet duct leading to each of said pressure responsive means, and means operable during the travel of said blades for closing said inlet duct.

10. A shear mechanism for severing charges of molten glass from a suspended mass of such glass comprising a pair of opposed shear blades each mounted for rotation about a common axis, a latch for locking said blades against rotation and in a fixed position remote from said mass, a pressure responsive motor connected to said latch, a pressure responsive motor for rotating said blades through one revolution, means for periodically delivering pressure to said motors to disengage said latch and rotate said shears, and means operable prior to the end of a complete revolution of said shear blades for closing said pressure delivery means.

11. A shear mechanism for severing charges of molten glass from a suspended mass of such glass comprising a pair of opposed shear blades each mounted for rotation about a common axis, a latch for locking said blades against rotation and in a fixed position remote from said mass, a pressure responsive motor connected to said latch, a pressure responsive motor for rotating said blades through one revolution, an inlet duct leading to said motors, means for periodically delivering pressure to said motors through said duct to disengage said latch and rotate said shears, and means operable prior to the end of a complete revolution of said shear blades for closing said inlet duct.

12. A shear mechanism for severing charges of molten glass from a suspended mass of such glass, comprising opposed shear blades, each mounted for rotation about an established axis, means for locking said blades in a position of rest remote from such mass, means for disengaging and holding said locking means in inoperative position, means for rotating each blade through a complete revolution back to such position of rest, and means dependent on the position of said blades for releasing said locking means.

13. A shear mechanism for severing charges of molten glass from a mass of such glass, comprising opposed shear blades, each mounted for rotation about a common axis, means for holding said blades in a position of rest remote from said mass, means for moving and retaining said holding means in inoperative position, means for rotating each such blade from such position of rest and back to such position, while such holding means is disengaged, means operably associated with said rotating means for releasing said blade holding means, and means for adjusting the vertical position of such blades with relation to such mass.

14. A shear mechanism, comprising relatively mounted shear blades, means for releasably locking said blades in a fixed position, means for disengaging and holding said blade locking means in an inoperative position, means for rotating said blades to move the same to cutting position, means associated with said rotating means and operable as said blades move for retarding the speed of rotation of said blades, and means dependent upon the position of said blades for releasing said blade locking means.

15. A shear mechanism comprising coaxially mounted shear blades, means for releasably locking said blades in a fixed position, pressure responsive means for disengaging and holding said blade locking means in inoperative position, pressure responsive means for rotating said blades in opposite directions through one revolution, and means operable during the movement of said blades for retarding the speed of rotation of said blades.

16. A shear mechanism comprising coaxially mounted shear blades, a train of gears associated with said blades, a bar yieldingly engaging and locking said gears in a fixed position, means for withdrawing said bar from said gears and holding it in inoperative position, means operable when said bar is withdrawn from the gears for driving said gears to turn the blades, and means dependent on the rotation of said gears for releasing said bar to relock the gears in a fixed position.

17. A shear mechanism comprising coaxially mounted shear blades, a bar yieldingly locking said blades in a fixed position, pressure responsive means for moving said bar to release said blades, pressure responsive means for rotating said blades in opposite directions, a pressure inlet duct leading to each of said pressure responsive means, and means operable as said blades move in response to said blade actuating means for closing said inlet duct to permit said bar to re-engage and lock said blades in fixed position.

18. A method of severing mold charges of molten glass from a suspended stream of such glass by means of two opposed shear blades, which comprises moving said blades in opposite directions so that each passes the other within the confines of such stream and while moving continuously to a position of rest remote from such stream, retaining each such blade at its position of rest until initiating the next cutting operation, and in controlling the frequency of such cutting operations by varying the duration of the periods of rest of said blades.

19. A shear mechanism for severing charges of molten glass from a suspended stream of such glass, comprising two opposed blades, means for simultaneously moving said blades in opposite directions such that each blade moves in one continuous motion through the axis of such stream and to a position of rest remote therefrom, and means for timing the operation of said blade moving means by varying the period during which said blades are maintained at such positions of rest.

20. A shear mechanism for severing charges of molten glass from a suspended stream of such glass, comprising two opposed blades, means for simultaneously moving said blades in opposite directions such that each blade moves in one continuous motion through the axis of said stream and to a position of rest remote therefrom, means for holding such blades in such positions of rest, and means for timing the operation of said blade operating means by varying the period during which said blades are held in such positions of rest.

21. A shear mechanism for severing charges of molten glass from a suspended stream of such glass, comprising two opposed blades, means for simultaneously moving said blades in opposite directions such that each blade moves in one continuous motion through the axis of said stream and to a position of rest remote therefrom, means for releasably holding such blades in such positions of rest, means for operating said blade holding means and means for timing the operation of said blade moving means.

22. A shear mechanism, comprising opposed shear blades, means operatively connecting said blades, an overrunning device for actuating said means, means for moving said device in two directions, and means for locking said first mentioned means during the movement of said overrunning device in one direction.

23. A shear mechanism, comprising opposed shear blades, an over-running device for actuating said blades, means for moving said device in two directions, and means for holding said blades during the movement of said device in one direction.

24. A shear mechanism, comprising opposed shear blades, ratchet and pawl elements for actuating said blades, means for moving one of said ratchet and pawl elements forward and back, a lock for locking said blades against motion during backward movement of such element, and means for moving said lock to an inoperative position prior to the blade actuating movement of such element.

25. A shear mechanism, comprising a pair of rotatably mounted shear blades, a reciprocating motor for rotating said blades, and an overrunning device between said motor and said blades.

26. A shear mechanism, comprising a pair of opposed rotatably mounted shear blades, a reciprocating motor for rotating said blades, and a ratchet and pawl connection between said blades and said motor.

27. A shear mechanism, comprising a pair of opposed rotatably mounted shear blades, a reciprocating motor for rotating said blades, and means for holding said blades stationary during one movement of said motor.

28. In a glass shear, means for moving a shear blade at a high speed through a stream of molten glass, means for retarding said blade after it has passed through said stream, a latch for arresting the motion of said blade at a point remote from said stream, and means for periodically releasing said latch.

29. In a glass shear, a shear blade for severing charges of molten glass from a mass of the same, a motor for moving said blade to sever such a charge from such mass, a latch for locking said blade in a position remote from such mass, means acting while said latch is in blade locking position for rendering said motor capable of moving said blade, and means for withdrawing said latch to release said blade to the action of said motor.

30. In a glass shear, a shear blade for severing charges of molten glass from a mass of the same, a motor for moving said blade to sever such a charge from said mass, a latch for locking said blade in a position remote from such mass, means acting while said latch is in blade locking position for rendering said motor capable of moving said blade, means for withdrawing said latch to release said blade to the action of said motor, and means for retarding the motion of said blade after it has severed a charge from such mass.

31. In a shear mechanism for severing charges of molten glass from a mass of the same, a shear blade, a motor for moving said blade to sever a charge of glass from such mass, a releasable latch for locking said blade in a position remote from said mass, and means for delivering energizing force to said motor while said latch is in blade locking position.

32. In a shear mechanism for severing charges of molten glass from a mass of the same, a shear blade, a motor for moving said blade to sever a charge of glass from such mass, a releasable latch for locking said blade in a position remote from said mass, means for delivering energizing force to said motor while said latch is in blade locking position, and means for retarding the speed of said motor after said blade has severed a charge from such mass and as it moves toward the latch locking position.

33. In a shear mechanism for severing charges of molten glass from a mass of the same, a shear blade, means for moving said blade to sever a charge of glass from such mass including a fluid energized motor, a releasable latch for locking said blade in a position remote from said mass, and means for delivering motive fluid to said motor while said latch is in blade locking position.

34. In a shear mechanism for severing charges of molten glass from a mass of the same, a shear blade, means including a fluid energized motor for moving said blade to sever a charge of glass from said mass, a releasable latch for locking said blade in a position remote from said mass, means for delivering motive fluid to said motor while said latch is in blade locking position, and means for moving said latch to a blade releasing position.

35. In a shear mechanism for severing charges of molten glass from a mass of the same, a shear blade, means for moving said blade to sever a charge of glass from such mass including a fluid energized motor, a releasable latch for locking said blade in a position remote from said mass, means for delivering motive fluid to said motor while said latch is in blade locking position, and means for retarding the speed of said motor after said blade has severed a charge from such mass and as it moves toward the latch locking position.

36. In a shear mechanism for severing charges of molten glass from a mass of the same, a shear blade, means for moving said blade to sever a charge of glass from such mass including a fluid energized motor, a releasable latch for locking said blade in a position remote from said mass, means for delivering motive fluid to said motor while said latch is in blade locking position, means for moving said latch to a blade releasing position, and means for retarding the speed of said motor after said blade has severed a charge from such mass and as it moves toward the latch locking position.

37. A shear mechanism for severing successive mold charges from a flowing stream of molten glass comprising opposed shear blades mounted for movement in opposite directions, means for simultaneously moving said blades through said stream and to a point remote therefrom and for accelerating the movement of said blades as they approach the confines of said stream and thereafter for decelerating such movement until each said blade is brought to rest, and means for holding said blades in such position of rest.

38. A shear mechanism for severing successive mold charges from a suspended stream of molten glass comprising rotatably mounted shear blades, means for holding such blades in a position of rest remote from said stream, means for releasing said holding means, and means operable while said holding means are released for rotating said blades to move the same across each other in cutting engagement within the confines of said stream and back to such position of rest.

FRANK L. O. WADSWORTH.